United States Patent
Zhai et al.

(10) Patent No.: US 11,548,967 B2
(45) Date of Patent: Jan. 10, 2023

(54) PREPARATION METHOD FOR POLYCARBOXYLATE WATER REDUCER HAVING REGULAR SEQUENCE STRUCTURE

(71) Applicants: SOBUTE NEW MATERIALS CO., LTD., Nanjing (CN); BOTE BUILDING MATERIALS (TIANJIN) CO., LTD., Tianjin (CN); NANJING BOTE NEW MATERIALS CO., LTD., Nanjing (CN); BOTE NEW MATERIALS TAIZHOU JIANGYAN CO., LTD, Taizhou (CN)

(72) Inventors: Shuying Zhai, Nanjing (CN); Yong Yang, Nanjing (CN); Dongliang Zhou, Nanjing (CN); Xin Shu, Nanjing (CN); Qianping Ran, Nanjing (CN); Han Yan, Nanjing (CN); Hongxia Zhao, Nanjing (CN)

(73) Assignees: SOBUTE NEW MATERIALS CO., LTD., Nanjing (CN); NANJING BOTE NEW MATERIALS CO., LTD., Tianjin (CN); BOTE BUILDING MATERIALS (TIANJIN) CO., LTD., Taizhou (CN); BOTE NEW MATERIALS TAIZHOU JIANGYAN CO., LTD.

( * ) Notice: Subject to any disclaimer, the term of this patent is extended or adjusted under 35 U.S.C. 154(b) by 320 days.

(21) Appl. No.: 16/958,709

(22) PCT Filed: Feb. 26, 2019

(86) PCT No.: PCT/CN2019/076183
§ 371 (c)(1),
(2) Date: Jun. 28, 2020

(87) PCT Pub. No.: WO2019/129307
PCT Pub. Date: Jul. 4, 2019

(65) Prior Publication Data
US 2021/0009741 A1  Jan. 14, 2021

(30) Foreign Application Priority Data
Dec. 29, 2017 (CN) .......................... 201711470052.5

(51) Int. Cl.
C08F 283/06 (2006.01)
C04B 24/26 (2006.01)
C08K 5/39 (2006.01)
C04B 103/30 (2006.01)

(52) U.S. Cl.
CPC ........ *C08F 283/06* (2013.01); *C04B 24/2658* (2013.01); *C08K 5/39* (2013.01); *C04B 2103/302* (2013.01); *C08F 2438/03* (2013.01)

(58) Field of Classification Search
CPC ............... C08F 283/06; C08F 2438/03; C04B 24/2658; C04B 2103/302; C08K 5/39
See application file for complete search history.

(56) References Cited

U.S. PATENT DOCUMENTS

2010/0029838 A1* 2/2010 Haubennestel ...... C09D 131/02
524/548

FOREIGN PATENT DOCUMENTS

| | | |
|---|---|---|
| CN | 101580353 | 11/2009 |
| CN | 104016610 | 9/2014 |
| CN | 104311761 | 1/2015 |
| CN | 104371077 | 2/2015 |
| CN | 105153375 | 12/2015 |
| CN | 105175658 | 12/2015 |
| CN | 105669913 | 6/2016 |
| CN | 105713150 | 6/2016 |
| CN | 108059697 | 5/2018 |
| JP | 2000264695 | 9/2000 |

* cited by examiner

*Primary Examiner* — John E Uselding
(74) *Attorney, Agent, or Firm* — Treasure IP Group, LLC

(57) ABSTRACT

Disclosed is a preparation method of a polycarboxylate water reducer having a regular sequence structure. The preparation method of the present invention comprises: performing Michael addition on polyethylene glycol ether acrylate macromonomer A and amino-containing carboxylic acid B for 5-12 hours, then cooling to 0° C., dropwise adding acryloyl chloride slowly and evenly, and further reacting for 12 hours at room temperature to obtain carboxyl-containing polyether macromonomer C; mixing the carboxyl-containing polyether macromonomer C, a small molecular RAFT reagent, an initiator, and water adequately; and holding the polymerization mass concentration at 30%-60% and heating to 60-80° C. in the atmosphere of N2 to react for 2-5 hours to obtain the polycarboxylate water reducer having a regular sequence structure.

4 Claims, No Drawings

PREPARATION METHOD FOR POLYCARBOXYLATE WATER REDUCER HAVING REGULAR SEQUENCE STRUCTURE

CROSS REFERENCE TO RELATED APPLICATION

This application claims priority to a PCT application PCT/CN2019/076183 filed on Feb. 2, 2019, which in turn claims priority to a Chinese Application No. 201711470052.5, filed on Dec. 29, 2017. The PCT and Chinese Applications are incorporated herein by reference in their entireties.

BACKGROUND OF THE INVENTION

1. Technical Field

The present invention relates to a polycarboxylate water reducer having a regular sequence structure and a preparation method thereof, belonging to the technical field of concrete admixtures.

2. Description of Related Art

In recent years, with the development of concrete technology, the application of high-performance polycarboxylate water reducers has been popularized. With their many advantages such as low dosage, high water reduction rate, excellent slump retention, low shrinkage, energy saving and environmental friendliness, the high-performance polycarboxylate water reducers have been widely used in many projects. However, in actual engineering use, the polycarboxylate water reducers often have adaptability problems with cement and mineral admixtures (fly ash, mineral powder, etc.). Moreover, due to the shortage of resources, a large number of projects use machine-made sand instead of natural river sand, which causes new adaptability problems between polycarboxylate water reducers and machine-made sand.

At present, the adaptability problem is mainly presented as that the slump fails to meet the design requirements or the slump loss is too large over time. It may even cause abnormal coagulation such as rapid or false coagulation or severe bleeding, which eventually leads to the reduction in concrete mechanical properties and durability. The compatibility problem with the concrete component materials not only increases the difficulty in the control process of construction using polycarboxylate water reducers, but also greatly increases the cost of using polycarboxylate water reducers in concrete, which causes a great negative impact on the wide application of polycarboxylate water reducer in engineering.

From the perspective of polymerization methods, high-performance polycarboxylate water reducers widely use free radical polymerization methods. The disadvantage of traditional free radical polymerization is that the resulting polymer shows polydispersity and uncontrollable microstructure, which is fundamentally related to the mechanism of slow initiation, rapid growth, and rapid termination. With the deep exploration of the structure-activity relationship of the random-structure polycarboxylate water reducers and the limit optimization of the performance of comb-shaped copolymer admixtures, the researchers found that the further performance improvement and functionalization of the comb-shaped copolymers entered a bottleneck state, and the comb-shaped polymer dispersants currently used hardly meet the new and higher requirements of concrete, and there is not much room for development.

For this reason, many researchers at home and abroad continue to explore high-performance polymer dispersants of new topological structures. Block, star-shaped, and hyperbranched structures and the like are used in polycarboxylate water reducers. CN104311761A uses a reversible addition-fragmentation chain transfer polymerization method to prepare a comb-shaped polyether block polyacrylate copolymer dispersant and applies it to the dispersion of a cement system. However, the copolymer dispersant is composed of polyether blocks and polyacrylate blocks. With simple composition, simple structure and few adjustable factors in the solution conformation, the copolymer dispersant has poor adaptability to concrete components during actual use. CN104371077A discloses the use of atom transfer radical polymerization to synthesize a star-shaped polyacrylate water reducer. This method has the disadvantages of difficulty in preparing an initiator and high price. CN101580353 discloses a hyperbranched polycarboxylate superplasticizer and its preparation method, where a copolymer main chain is formed by tert-butyl (meth) acrylate, sodium methacrylic acid sulfonate, allyl polyoxyethylene ether under the action of an initiator azodicyanovaleric acid, and then the reaction of (meth)acrylic acid reacts with ethylenediamine to form a hyperbranched copolymer. The product has the advantages of low dosage, high water reduction rate, and small slump loss, but its preparation process is complicated, requiring polymerization, vacuum distillation, condensation, hydrolysis reflux, separation and purification, and moreover due to use of multiple organic solvents, the production cost is high, and it is also easy to cause environmental pollution.

In summary, it is very necessary to provide a method for synthesizing polycarboxylate with low dosage, high water reduction rate, small slump loss and strong adaptability.

BRIEF SUMMARY OF THE INVENTION

The present invention is directed to the problems of insufficient water-reducing effect, fast slump loss and poor cement adaptability of the existing random-structure polycarboxylate water reducer, and provides a preparation method of a high-performance polycarboxylate water reducer having a regular sequence structure. The product produced has the advantages of low dosage, high water reduction rate, small slump loss, strong adaptability, etc., and the preparation process is simple and the production cost is low.

Generally speaking, when a polymer is composed of two or more structural units, there are multiple arrangements and combinations of the chain structure of the polymer, that is, there are multiple sequence structures. If a polymer is composed of two structural units, A and B, when the structural units are randomly arranged in the molecular chain (-AAABBABBAAABBBBAABAB-), the sequence structure is a random structure, which belongs to the structural category of the traditional comb-shaped polycarboxylate water reducer; when the units A and B of the polymer are arranged in an alternating copolymerization (-ABABABABABAB-), the sequence structure is a regular alternating copolymerization structure.

The present invention provides a preparation method of a polycarboxylate water reducer having a regular sequence structure, comprising the steps of:

(1) performing Michael addition on polyethylene glycol ether acrylate macromonomer A and amino-containing carboxylic acid B at 10-50° C. for 5-12 hours, then cooling to 0° C., dropwise adding acryloyl chloride slowly and evenly for 30 minutes, then heating to room temperature and further reacting for 12 hours at room temperature to obtain carboxyl-containing polyether macromonomer C, wherein the molar ratio of the polyethylene glycol ether acrylate macromonomer A to the amino-containing carboxylic acid B to acryloyl chloride is 1: (1-1.2): (1-1.2); and (2) mixing the carboxyl-containing polyether macromonomer C prepared in step (1), a small molecular RAFT reagent, an initiator, and water adequately, and holding the polymerization mass concentration at 30%-60% and heating to 60-80 ° C. in the atmosphere of $N_2$ to react for 2-5 hours to obtain the polycarboxylate water reducer having a regular sequence structure, wherein the molar ratio of the small molecular RAFT reagent to the carboxyl-containing polyether macromonomer C to the initiator is (3-5): (150-400): 1;

and wherein the polyethylene glycol ether acrylate macromonomer A in step (1) is any one of acrylic polyethylene glycol monomethyl ether, acrylic polyethylene glycol monoethyl ether, acrylic polyethylene glycol mono-n-butyl ether, and acrylic polyethylene glycol monoisobutyl ether, and the weight-average molecular weight of the polyethylene glycol ether acrylate macromonomer A is 500-1200; the molecular weight which is too low or too large will result in poor product performance;

the amino-containing carboxylic acid B in step (1) is any one of 3-aminopropionic acid, 4-aminobutyric acid, 5-aminovaleric acid, 2-aminosuccinic acid, 2-amino-3-hydroxysuccinic acid, 2-amino-3-methyl-succinic acid, and DL-2-aminoglutaric acid;

the polycarboxylate water reducer having a regular sequence structure in step (2) has a structural formula of:

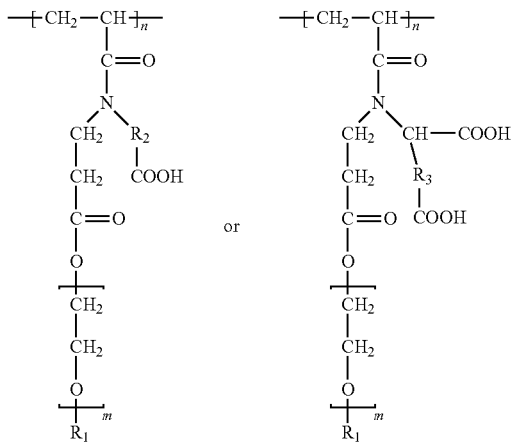

wherein $R_1$ represents alkyl with 1 to 3 carbon atoms, $R_2$ represents —$CH_2CH_2$—, —$CH_2CH_2CH_2$— or —$CH_2CH_2CH_2CH_2$—, $R_3$ is —$CH_2$—, —$CH_2CH_2$—, —CH(—OH)— or —CH(—$CH_3$)—, n and m represent the number of repeating units of each repeating unit; the weight-average molecular weight of the polycarboxylate water reducer having a regular sequence structure is 20,000 to 60,000; if the molecular weight is too low, the initial dispersing ability of the admixture will be reduced; if the molecular weight is too high, the initial dispersing ability and slump retention of the admixture will be weakened.

The small molecular RAFT reagent in step (2) is any of S,S'-bis(2-methyl-2-propionic acid) trithiocarbonate (BDMAT), and (4-cyano-4-[(ethylsulfanylthiocarbonyl)sulfanyl] pentane acid (CETPA).

The initiator in step (2) is potassium persulfate, ammonium persulfate, azobisisobutylamidine hydrochloride (V-50), azobisisobutylimidazoline hydrochloride (VA-044), azobiscyanovaleric acid (V-501), and azodiisopropylimidazoline (VA-061). These initiators are all soluble in water and have high efficiency.

The polymerization mass concentration is 30-60%, and the polymerization temperature is 60-80° C. If the concentration or temperature is too low, the reaction conversion rate will be low. If the concentration is too high, the small molecular RAFT reagent will not be able to control the reaction very well, which will cause adverse effects on the next step.

the reaction time in step (2) is 2 to 5 hours. If the reaction time is too short, the reaction conversion rate will be low, and if the reaction time is too long, the energy consumption will be wasted and the production efficiency will be reduced.

The present invention also provides the application of a polycarboxylate water reducer having a regular sequence structure in the preparation of concrete. The prepared polycarboxylate water reducer having a regular sequence structure can be used directly, or according to the actual construction situation, the polycarboxylate water reducer having a regular sequence structure may also be mixed with a certain proportion of functional additives such as a foaming agent, a retarder, an air-entraining agent and a thickening agent in a compounding way to adjust the gas content, setting time and cohesion of cement-based materials and improve the comprehensive performance of the cement-based materials.

The dosage of the polycarboxylate water reducer having a regular sequence structure according to the present invention is 0.1% to 0.5% of the total weight of the gelling material. If the dosage is too low, the dispersion effect on cement is unsatisfactory; if the dosage is too high, bleeding is likely to occur, which also causes economic waste. The engineering staff can choose an optional dosage within this range according to the actual situation.

The polycarboxylate water reducer having a regular sequence structure of the present invention is suitable for areas with high aggregate content of sand and gravel aggregates, and has the advantages of low admixture, high water reduction and high slump retention; the preparation process of the polycarboxylate water reducer having a regular sequence structure of the present invention is simple, and the production process is environmentally friendly and low-cost.

DETAILED DESCRIPTION OF THE INVENTION

The present invention will be detailed below with reference to specific embodiments, so as to better understand the content of the invention, but the content of the embodiments does not limit the protection scope of the invention.

The weight-average molecular weight and polymerization conversion rate of the polycarboxylate water reducer described in the embodiments were measured by high-performance gel chromatography (GPC). The separation column used two Shodex SB806+803 gel chromatography columns in series, with the column temperature of 40° C., using a 0.1M $NaNO_3$ aqueous solution as the mobile phase at a flow rate of 1.0 ml/min, and the injection volume was 20 μl of 0.5% aqueous solution; Detector: Shodex RI-71 type refractive index detector; the standard curve is made using polyethylene glycol GPC standard substance (Sigma-Aldrich, with molecular weight of 1010000, 478000, 263000, 118000, 44700, 18600, 6690, 1960, 628, 232).

The raw material small molecular RAFT reagent (>97%) used in the embodiments of the present invention was purchased from Sigma-Aldrich Company. The Polyethylene glycol monomethyl ether methacrylate macromonomer (double bond retention value>98%) was produced by Nanjing Bote New Materials Co., Ltd. Other raw materials were commercially available ordinary analytical reagents.

The raw materials used in the embodiments are listed in Table 1.

TABLE 1

Compound codes in the synthesis examples

| Code | Name of Compound | Source |
| --- | --- | --- |
| A-1 | Acrylic polyethylene glycol monomethyl ether (Mw = 500) | Commercially available |
| A-2 | Acrylic polyethylene glycol monoethyl ether (Mw = 750) | Commercially available |
| A-3 | Acrylic polyethylene glycol mono-n-butyl ether (Mw = 1000) | Commercially available |
| A-4 | Acrylic polyethylene glycol monoisobutyl ether (Mw = 1200) | Commercially available |
| B-1 | 3-aminopropionic acid | Commercially available |
| B-2 | 4-aminobutyric acid | Commercially available |
| B-3 | 5-aminovaleric acid | Commercially available |
| B-4 | 2-aminosuccinic acid | Commercially available |
| B-5 | 2-amino-3-hydroxysuccinic acid | Commercially available |
| B-6 | 2-amino-3-methyl-succinic acid | Commercially available |
| B-7 | DL-2-aminoglutaric acid | Commercially available |

EXAMPLE 1

100 g of A-1 and 17.82 g of B-1 were added to a flask equipped with a stirrer and then subjected to the Michael addition reaction at 10° C. for 5 h; the reaction system was then cooled to 0° C., and 18.1 g of acryloyl chloride was dropwise added slowly for 30 min, and the reaction was continued at room temperature for 12 h; 1.18 g of a small molecular RAFT reagent BDMAT, 0.36 g of an initiator potassium persulfate and 320 g of water were further put into the flask; at this moment, the polymerization concentration was 30%, the reaction system was then heated to 60° C. in the atmosphere of $N_2$; after 2 hours of reaction, a polycarboxylate water reducer having a regular sequence structure was obtained, and the weight-average molecular weight of the polycarboxylate water reducer was 25,300.

EXAMPLE 2

187.5 g of A-2 and 30.93 g of B-2 were added to a flask equipped with a stirrer and then subjected to the Michael addition reaction at 30° C. for 7 h; the reaction system was then cooled to 0° C., and 27.15 g of acryloyl chloride was dropwise added slowly for 30 min, and the reaction was continued at room temperature for 12 h; 0.92 g of a small molecular RAFT reagent BDMAT, 0.14 g of an initiator ammonium persulfate and 250 g of water were further put into the flask; at this moment, the polymerization concentration was 50%, the reaction system was then heated to 70° C. in the atmosphere of $N_2$; after 3 hours of reaction, a polycarboxylate water reducer having a regular sequence structure was obtained, and the weight-average molecular weight of the polycarboxylate water reducer was 37,600.

EXAMPLE 3

165 g of A-3 and 39.83 g of B-3 were added to a flask equipped with a stirrer and then subjected to the Michael addition reaction at 50° C. for 12 h; the reaction system was then cooled to 0° C., and 15.08 g of acryloyl chloride was dropwise added slowly for 30 min, and the reaction was continued at room temperature for 12 h; 1.01 g of a small molecular RAFT reagent CETPA, 0.23 g of an initiator V-50 and 330 g of water were further put into the flask; at this moment, the polymerization concentration was 40%, the reaction system was then heated to 80° C. in the atmosphere of $N_2$; after 5 hours of reaction, a polycarboxylate water reducer having a regular sequence structure was obtained, and the weight-average molecular weight of the polycarboxylate water reducer was 52,300.

EXAMPLE 4

240 g of A-4 and 26.62 g of B-4 were added to a flask equipped with a stirrer and then subjected to the Michael addition reaction at 25° C. for 8 h; the reaction system was then cooled to 0° C., and 21.72 g of acryloyl chloride was dropwise added slowly for 30 min, and the reaction was continued at room temperature for 12 h; 1.96 g of a small molecular RAFT reagent BDMAT, 0.43 g of an initiator V-044 and 195 g of water were further put into the flask; at this moment, the polymerization concentration was 60%, the reaction system was then heated to 65° C. in the atmosphere of $N_2$; after 4 hours of reaction, a polycarboxylate water reducer having a regular sequence structure was obtained, and the weight-average molecular weight of the polycarboxylate water reducer was 42,800.

EXAMPLE 5

100 g of A-1 and 29.82 g of B-5 were added to a flask equipped with a stirrer and then subjected to the Michael addition reaction at 35° C. for 6 h; the reaction system was then cooled to 0° C., and 18.1 g of acryloyl chloride was dropwise added slowly for 30 min, and the reaction was continued at room temperature for 12 h; 1.21 g of a small molecular RAFT reagent CETPA, 0.28 g of an initiator V-501 and 350 g of water were further put into the flask; at this moment, the polymerization concentration was 30%, the reaction system was then heated to 75° C. in the atmosphere of $N_2$; after 3 hours of reaction, a polycarboxylate water reducer having a regular sequence structure was obtained, and the weight-average molecular weight of the polycarboxylate water reducer was 37,900.

EXAMPLE 6

125 g of A-1 and 44.14 g of B-6 were added to a flask equipped with a stirrer and then subjected to the Michael addition reaction at 45° C. for 5 h; the reaction system was then cooled to 0 ° C., and 27.15 g of acryloyl chloride was dropwise added slowly for 30 min, and the reaction was continued at room temperature for 12 h; 1.01 g of a small molecular RAFT reagent CETPA, 0.16 g of an initiator V-061 and 360 g of water were further put into the flask; at this moment, the polymerization concentration was 35%, the reaction system was then heated to 70° C. in the atmosphere of $N_2$; after 4 hours of reaction, a polycarboxylate water reducer having a regular sequence structure was obtained, and the weight-average molecular weight of the polycarboxylate water reducer was 58,700.

EXAMPLE 7

125 g of A-3 and 40.46 g of B-7 were added to a flask equipped with a stirrer and then subjected to the Michael addition reaction at 10° C. for 11 h; the reaction system was then cooled to 0° C., and 27.15 g of acryloyl chloride was dropwise added slowly for 30 min, and the reaction was continued at room temperature for 12 h; 1.1 g of a small molecular RAFT reagent BDMAT, 0.34 g of an initiator V-50 and 290 g of water were further put into the flask; at this moment, the polymerization concentration was 40%, the reaction system was then heated to 80° C. in the atmosphere of $N_2$; after 5 hours of reaction, a polycarboxylate water reducer having a regular sequence structure was obtained, and the weight-average molecular weight of the polycarboxylate water reducer was 32,300.

EXAMPLE 8

250 g of A-2 and 35.64 g of B-1 were added to a flask equipped with a stirrer and then subjected to the Michael addition reaction at 50° C. for 12 h; the reaction system was then cooled to 0° C., and 30.17 g of acryloyl chloride was dropwise added slowly for 30 min, and the reaction was continued at room temperature for 12 h; 4.48 g of a small molecular RAFT reagent CETPA, 0.60 g of an initiator V-50 and 215 g of water were further put into the flask; at this moment, the polymerization concentration was 60%, the reaction system was then heated to 70° C. in the atmosphere of $N_2$; after 3 hours of reaction, a polycarboxylate water reducer having a regular sequence structure was obtained, and the weight-average molecular weight of the polycarboxylate water reducer was 46,900.

COMPARATIVE EXAMPLE 1

185 g of water and 275.5 g of allyl polyoxyethylene ether (with a molecular weight of 2400) were added to a flask equipped with a stirrer, stirred and heated until allyl polyoxyethylene ether was dissolved and then the solution was heated to 90° C., 54 g of acrylic acid, 1.26 g of 3-mercaptopropionic acid and 100 g of water were then mixed and stirred to make a uniform aqueous monomer solution, and the uniform aqueous monomer solution was dropwise added to the flask at a uniform rate for 3 h. At the same time, an initiator solution prepared from 160 g of water and 8.1g of potassium persulfate was added dropwise at a uniform rate for 3.5 h. After the solution was dropwise added completely, the temperature was kept constant for 3 h to obtain a randomly copolymerized polycarboxylate water reducer with a weight-average molecular weight of 38,400.

COMPARATIVE EXAMPLE 2

The target product was synthesized according to the method shown in Example 8 in patent CN107337766A.

APPLICATOIN EXAMPLE 1

With reference to the relevant provisions of JC473-2001 "Concrete Pumping Agent", the influence of the polycarboxylate water reducer having a regular sequence structure of the present invention on freshly mixed concrete was determined. The water-cement ratio was fixed at 0.43, and the dosage of the water reducer was adjusted so that the initial slump of concrete is 22±1cm; according to the weight mix ratio, the concrete comprised 267 parts of cement, 53 parts of mineral powder, 60 parts of fly ash, 767 of sand, 800 parts of stone, 260 parts of gravel, and 163 parts of water. The test results are shown in Table 2.

TABLE 2

Performance test results of concrete

| Sample | Dosage (%) | Air content (%) | Slump (cm) 2 min | Slump (cm) 30 min | Extension (cm) 2 min | Extension (cm) 30 min |
|---|---|---|---|---|---|---|
| Example 1 | 0.15 | 3.2 | 22 | 19 | 49 | 36.5 |
| Example 2 | 0.15 | 2.9 | 22.5 | 19 | 48 | 36 |
| Example 3 | 0.15 | 3.5 | 22.5 | 20 | 50 | 37.5 |
| Example 4 | 0.16 | 3.1 | 21 | 19.5 | 48 | 36.5 |
| Example 5 | 0.16 | 3.7 | 21.5 | 19 | 47.5 | 36 |
| Example 6 | 0.16 | 3.3 | 22 | 19.5 | 48.5 | 36.5 |
| Example 7 | 0.16 | 2.9 | 21.5 | 18.5 | 49.5 | 37 |
| Example 8 | 0.17 | 3.5 | 22 | 19.5 | 50 | 37.5 |
| Comparative Example 1 | 0.19 | 3.4 | 22 | 19 | 48 | 36 |
| Comparative Example 2 | 0.22 | 3.8 | 21 | 18.5 | 47.5 | 35.5 |

From the above test results, it can be seen that in the case where the dosages in the examples are all lower than the dosages in the comparative examples, and the initial fluidity and 30 min fluidity of the concrete are approximately the same as those of the comparative examples, which indicates that the polycarboxylate water reducer having a regular sequence structure according to the invention has excellent water reduction and slump retention properties.

APPLICATION EXAMPLE 2

In order to evaluate the clay adaptability of the polycarboxylate water reducer having a regular sequence structure prepared by the present invention, the synthesis examples and comparative examples were tested for cement paste fluidity with reference to the GB/T8077-2012 standard, and cement paste fluidity after 30 minutes and 1 hour was also tested. The test cement was Jiangnan-Xiaoyetian P.II 52.5 cement. 300 g of cement was weighed and mixed with 87 g of water. In the actual test, a small amount of montmorillonite was used to replace the cement of corresponding mass. The montmorillonite was a 250-mesh powder sample produced in Tangshan, Hebei. The test results are shown in Table 3.

TABLE 3

Comparison results of cement paste

| No. | Cement (g) | Montmorillonoid (g) | Water (g) | Dosage (%) | Cement paste fluidity (mm) 4 min | Cement paste fluidity (mm) 30 min | Cement paste fluidity (mm) 60 min |
|---|---|---|---|---|---|---|---|
| Example 1 | 300 | 0 | 87 | 0.10 | 269 | 245 | 220 |
|  | 297 | 3 | 87 | 0.11 | 261 | 238 | 215 |
|  | 294 | 6 | 87 | 0.12 | 258 | 231 | 210 |
| Example 3 | 300 | 0 | 87 | 0.10 | 262 | 248 | 228 |
|  | 294 | 6 | 87 | 0.12 | 250 | 228 | 214 |

TABLE 3-continued

Comparison results of cement paste

| No. | Cement (g) | Montmo-rillonoid (g) | Water (g) | Dosage (%) | Cement paste fluidity (mm) 4 min | 30 min | 60 min |
|---|---|---|---|---|---|---|---|
| Example 8 | 300 | 0 | 87 | 0.11 | 265 | 243 | 211 |
|  | 297 | 3 | 87 | 0.12 | 263 | 239 | 207 |
|  | 294 | 6 | 87 | 0.13 | 255 | 234 | 205 |
| Comparative Example 1 | 300 | 0 | 87 | 0.11 | 234 | 208 | 185 |
|  | 297 | 3 | 87 | 0.19 | 220 | 182 | 103 |
|  | 294 | 6 | 87 | 0.28 | 201 | 152 | 92 |
| Comparative Example 2 | 300 | 0 | 87 | 0.11 | 225 | 204 | 180 |
|  | 294 | 6 | 87 | 0.28 | 197 | 145 | 90 |

From the test results, it can be seen that with the increase of the content of montmorillonite, the examples only need to increase the dosage slightly to maintain the fluidity of the cement past; while the comparative examples need a substantial increase in the dosage to barely increase the fluidity and moreover the loss is faster, and there is basically no fluidity after 60 minutes, indicating that the regular sequence structure of the polycarboxylate water reducer has a more significant advantage in mud resistance than the random sequence structure.

APPLICATION EXAMPLE 3

In order to further evaluate the adaptability of the polycarboxylate water reducer having a regular sequence structure prepared by the present invention to machine-made sand in different regions, the mortar fluidity of the synthesis examples and comparative examples was tested with reference to the GB/T8077-2012 standard, and the mortar fluidity after 1 hour and 2 hours was also tested. The test cement was Jiangnan-Xiaoyetian P.I152.5 cement; the fly ash was Nanning secondary ash; fine aggregates were selected from machine-made sands in Guizhou, Sichuan and Zhejiang (different in mud content and stone powder content), of which Guizhou machine-made sand had a stone powder content of 15%, an MB value of 0.50, and a fineness modulus of 2.8, Sichuan machine-made sand had a stone powder content of 11%, an MB value of 0.75, and a fineness modulus of 3.0, Zhejiang machine-made sand had a stone powder content of 12%, an MB value of 1.35, and a fineness modulus of 2.9. The samples of Example 2, Example 4, Example 7, Comparative Example 1 and Comparative Example 2 were selected to perform adaptability comparison tests. According to the mix ratio, the mortar comprised of 280 parts of cement, 70 parts of fly ash, 750 parts of machine-made sand, and 155 parts of water. The test results are shown in Table 4.

TABLE 4

Comparison results of mortar

| Machine-made sand | No. | Dosage (%) | Cement paste fluidity (mm) 4 min | 60 min | 120 min |
|---|---|---|---|---|---|
| Guizhou machine-made sand | Example 2 | 0.12 | 278 | 256 | 234 |
|  | Example 4 | 0.12 | 269 | 250 | 234 |
|  | Example 7 | 0.12 | 262 | 245 | 224 |
|  | Comparative Example 1 | 0.18 | 262 | 224 | 186 |
|  | Comparative Example 2 | 0.19 | 265 | 230 | 190 |
| Sichuan machine-made sand | Example 2 | 0.13 | 268 | 253 | 234 |
|  | Example 4 | 0.13 | 275 | 259 | 232 |
|  | Example 7 | 0.13 | 264 | 246 | 227 |
|  | Comparative Example 1 | 0.19 | 253 | 225 | 197 |
|  | Comparative Example 2 | 0.20 | 258 | 221 | 193 |
| Zhejiang machine-made sand | Example 2 | 0.14 | 287 | 265 | 247 |
|  | Example 4 | 0.14 | 272 | 255 | 234 |
|  | Example 7 | 0.14 | 265 | 241 | 223 |
|  | Comparative Example 1 | 0.20 | 254 | 224 | 187 |
|  | Comparative Example 2 | 0.21 | 258 | 229 | 190 |

From the test results, it can be seen that the polycarboxylate water reducer having a regular sequence structure described in the examples has good adaptability to the machine-made sands in different regions, while the comparative examples need a substantial increase in the dosage to barely increase the fluidity and moreover the loss is faster, and there is basically no fluidity after 2 hours. From the overall examples and comparative examples, the polycarboxylate water reducer having a regular sequence structure synthesized by the present invention has good dispersibility and adaptability to machine-made sands in different regions.

What is claimed is:

1. A method for preparing a polycarboxylate water reducer having a regular sequence structure, comprising the steps of:
   (1) performing Michael addition on polyethylene glycol ether acrylate macromonomer A and amino-containing carboxylic acid B at 10-50° C. for 5-12 hours, then cooling to 0° C., dropwise adding acryloyl chloride slowly and evenly for 30 minutes, then heating to room temperature and further reacting for 12 hours at room temperature to obtain carboxyl-containing polyether macromonomer C,
   wherein the molar ratio of the polyethylene glycol ether acrylate macromonomer A to the amino-containing carboxylic acid B to acryloyl chloride is 1: (1-1.2): (1-1.2); and
   (2) mixing the carboxyl-containing polyether macromonomer C prepared in step (1), a small molecular RAFT reagent, an initiator, and water adequately, and holding the polymerization mass concentration at 30%-60% and heating to 60-80° C. in an atmosphere of $N_2$ to react for 2-5 hours to obtain the polycarboxylate water reducer having a regular sequence structure,
   wherein the molar ratio of the small molecular RAFT reagent to the carboxyl-containing polyether macromonomer C to the initiator is (3-5): (150-400): 1;
   and wherein the polyethylene glycol ether acrylate macromonomer A in step (1) is any one of acrylic polyethylene glycol monomethyl ether, acrylic polyethylene glycol monoethyl ether, acrylic polyethylene glycol mono-n-butyl ether, and acrylic polyethylene glycol monoisobutyl ether, and the weight-average molecular weight of the polyethylene glycol ether acrylate macromonomer A is 500-1200;

the amino-containing carboxylic acid B in step (1) is any one of 3-aminopropionic acid, 4-aminobutyric acid, 5-aminovaleric acid, 2-aminosuccinic acid, 2-amino-3-hydroxysuccinic acid, 2-amino-3-methyl-succinic acid, and DL-2-aminoglutaric acid;

the polycarboxylate water reducer having a regular sequence structure in step (2) has a structural formula of:

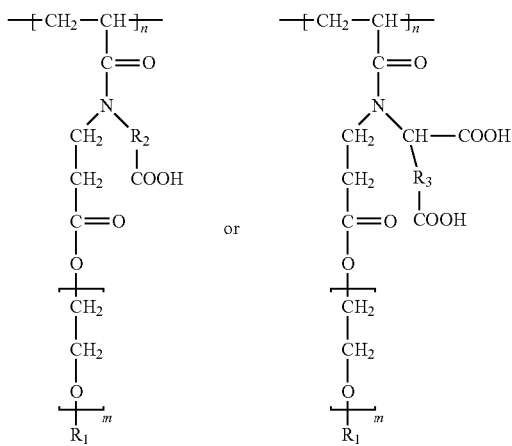

wherein $R_1$ represents alkyl with 1 to 3 carbon atoms, $R_2$ represents —$CH_2CH_2$—, —$CH_2CH_2CH_2$— or —$CH_2CH_2CH_2CH_2$—, $R_3$ is —$CH_2$—, —$CH_2CH_2$—, —$CH(—OH)$— or —$CH(—CH_3)$—, n and m represent the number of repeating units of each repeating unit; the weight-average molecular weight of the polycarboxylate water reducer having a regular sequence structure is 20,000 to 60,000.

2. The method for preparing the polycarboxylate water reducer with a regular sequence structure according to claim 1, wherein the small molecular RAFT reagent in step (2) is any of S, S'-bis(2-methyl-2-propionic acid) trithiocarbonate (BDMAT), and (4-cyano-4-[(ethylsulfanylthiocarbonyl) sulfanyl] pentane acid (CETPA).

3. The method for preparing the polycarboxylate water reducer having a regular sequence structure according to claim 2, wherein the initiator in step (2) is selected from the group consisting of potassium persulfate, ammonium persulfate, azobisisobutylamidine hydrochloride (V-50), azobisisobutylimidazoline hydrochloride (VA-044), azobiscyanovaleric acid (V-501), and azodiisopropylimidazoline (VA-061).

4. A polycarboxylate water reducer having a regular sequence structure prepared by the preparation method according to claim 1, wherein a dosage of the polycarboxylate water reducer having a regular sequence structure, being configured to be used in a gelling material, is at 0.1% to 0.5% of the total weight of the gelling material.

* * * * *